United States Patent
Zeng (10) Patent No.: US 10,667,138 B2
(45) Date of Patent: *May 26, 2020

(54) RESOURCE CONFIGURATION METHOD AND APPARATUS

(71) Applicant: HUAWEI TECHNOLOGIES CO., LTD., Shenzhen, Guangdong (CN)

(72) Inventor: Guangzhu Zeng, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,107

(22) Filed: Sep. 14, 2018

(65) Prior Publication Data
US 2019/0014480 A1    Jan. 10, 2019

Related U.S. Application Data

(63) Continuation of application No. PCT/CN2017/071722, filed on Jan. 19, 2017.

(30) Foreign Application Priority Data

Apr. 21, 2016    (CN) .......................... 2016 1 0252237

(51) Int. Cl.
*H04W 16/10*    (2009.01)
*H04W 72/04*    (2009.01)
(Continued)

(52) U.S. Cl.
CPC .......... *H04W 16/10* (2013.01); *H04L 5/0048* (2013.01); *H04L 5/0051* (2013.01);
(Continued)

(58) Field of Classification Search
CPC ............. H04W 16/10; H04W 72/0446; H04W 72/0453; H04L 5/0048; H04L 5/0051; H04L 5/0094
See application file for complete search history.

(56) References Cited

U.S. PATENT DOCUMENTS

2007/0015511 A1    1/2007 Kwun et al.
2013/0029657 A1    1/2013 Gao et al.
(Continued)

FOREIGN PATENT DOCUMENTS

CN    103718612 A    4/2014
CN    105340315 A    2/2016
(Continued)

OTHER PUBLICATIONS

R1-162164 Huawei, HiSilicon,"Considerations on New Radio Operation for Ultra Dense Networks",3GPP TSG RAN WG1 Meeting #84bis,Busan, Korea, Apr. 11-15, 2016,total 7 pages.

*Primary Examiner* — Ronald B Abelson
(74) *Attorney, Agent, or Firm* — Womble Bond Dickinson (US) LLP (57) ABSTRACT

A resource configuration method and apparatus, applied to a non-cellular system NCS that includes a plurality of transmission points TPs is described herein. The method may include determining a tracking resource in a time-frequency resource of each TP, where time-frequency resources of all the TPs are the same, and tracking resources determined for all the TPs are the same. The method may also include generating tracking resource configuration information based on a time-frequency resource occupied by the tracking resource. Furthermore, the method may include sending the tracking resource configuration information to each TP, so that each TP detects, on the tracking resource, a sounding reference signal SRS sent by a terminal, so as to improve NCS service performance.

20 Claims, 5 Drawing Sheets

Determine a tracking resource in a time-frequency resource of each TP, where time-frequency resources of all the TPs are the same, and tracking resources determined for all the TPs are the same — S201

Generate tracking resource configuration information based on a time-frequency resource occupied by the tracking resource — S202

Send the tracking resource configuration information to each TP, so that each TP detects, on the tracking resource, an SRS sent by a terminal — S203

(51) Int. Cl.
*H04L 5/00* (2006.01)
*H04W 88/00* (2009.01)

(52) U.S. Cl.
CPC ....... *H04L 5/0094* (2013.01); *H04W 72/0446* (2013.01); *H04W 72/0453* (2013.01); *H04L 5/0035* (2013.01); *H04L 5/0064* (2013.01); *H04W 88/00* (2013.01)

(56) References Cited

U.S. PATENT DOCUMENTS

2015/0334670 A1* 11/2015 Li ................... H04W 56/0015
2016/0183222 A1   6/2016 Suzuki et al.
2018/0205418 A1   7/2018 Zhang et al.
2019/0053014 A1* 2/2019 Liu .................... H04W 4/029

FOREIGN PATENT DOCUMENTS

| CN | 105376748 A | 3/2016 |
| CN | 105409308 A | 3/2016 |

\* cited by examiner

RESOURCE CONFIGURATION METHOD AND APPARATUS

CROSS-REFERENCE TO RELATED APPLICATIONS

This application is a continuation of International Application No. PCT/CN2017/071722, filed on Jan. 19, 2017, which claims priority to Chinese Patent Application No. 201610252237.8, filed on Apr. 21, 2016. The disclosures of the aforementioned applications are hereby incorporated by reference in their entireties.

TECHNICAL FIELD

This application relates to the field of communications technologies, and in particular, to a resource configuration method and apparatus.

BACKGROUND

A non-cellular system (NCS) includes a control device (CD), a logic entity (LE), and a transmission point (TP). One CD manages a plurality of LEs, and one LE manages a plurality of TPs.

Currently, in the NCS, all TPs corresponding to one LE use a same time-frequency resource, and all the TPs have same and fixed sub-band configurations. Each TP detects, in a same tracking resource (for example, a time-frequency resource), a sounding reference signal SRS sent by a terminal. When the terminal is connected to one TP, the LE determines a tracking channel for the terminal on the tracking resource of the TP, and the terminal sends the SRS on the tracking channel. In addition, the TP detects the SRS on the tracking resource in real time or cyclically, and obtains measurement information of the terminal (for example, a network location of the terminal and signal quality of the terminal) based on the SRS. The TP sends the measurement information to the LE, and the LE determines, based on the received measurement information from TPs that send the measurement information to the LE, a TP that provides a service for the terminal. In an actual application process, in the NCS, bandwidth of each TP is allowed to be dynamically divided based on an actual service load status, to further optimize the NCS. Consequently, tracking resources of TPs corresponding to one LE may be different.

However, in the foregoing process, when the terminal sends the SRS on the tracking channel, only TPs whose tracking resources include the tracking channel can correctly identify the SRS, and TPs whose tracking resources do not include the tracking channel cannot correctly identify the SRS. Therefore, the TPs whose tracking resources do not include the tracking channel cannot feed back the measurement information of the terminal to the LE, and the LE cannot accurately determine, from the TPs that send the measurement information to the LE, the TP that provides a service for the terminal. Consequently, NCS service performance is relatively poor.

SUMMARY

This application provides embodiments of a resource configuration method and apparatus, to improve NCS service performance.

According to a first aspect, this application provides a resource configuration method. The method is applied to an NCS that includes an LE and a plurality of TPs. A time-frequency resource of each TP can be dynamically divided. The method may be performed by a resource configuration apparatus disposed in the LE. When the resource configuration apparatus configures a tracking resource for the TPs in the LE, the resource configuration apparatus determines a same tracking resource in the time-frequency resource of each TP, generates tracking resource configuration information based on a time-frequency resource occupied by the tracking resource, and sends the tracking resource configuration information to each TP, so that tracking resources of all the TPs are the same, and further it is ensured that when a terminal sends an SRS on a tracking channel on the tracking resource, all TPs near the terminal can detect the SRS on the tracking resource, and send, to the LE, measurement information obtained based on the SRS. Therefore, the LE can accurately determine, from all the TPs near the terminal, a TP that provides a service for the terminal, thereby improving NCS service performance.

Optionally, the resource configuration apparatus may determine the tracking resource in the time-frequency resource of each TP by using the following three possible implementations.

In an embodiment of a feasible implementation, a same sub-band division is performed on the time-frequency resource of each TP, to obtain a plurality of sub-bands of each TP, and a tracking resource is determined in the plurality of sub-bands of each TP, so that the tracking resources of all the TPs are the same. In this embodiment of the feasible implementation, not only that the tracking resources of all the TPs in the LE are the same can be ensured, but also that sub-band configurations of all the TPs in the LE are the same can be ensured. In this way, when the terminal moves between different TPs in the LE, the terminal can be rapidly handed over from one TP to another TP with no need to reconfigure a service transmission resource for the LE by the resource configuration apparatus.

In another embodiment of a feasible implementation, a tracking sub-band is determined in the time-frequency resource of each TP, so that tracking sub-bands of all the TPs are the same, and a time-frequency resource occupied by the tracking sub-band is determined as the tracking resource; or a tracking timeslot is determined in the time-frequency resource of each TP, so that tracking timeslots of all the TPs are the same, and a time-frequency resource occupied by the tracking timeslot is determined as the tracking resource. In this feasible implementation, it is ensured that the tracking resources of all the TPs in the LE are the same. On the basis of this embodiment of the feasible implementation, after the tracking resource is determined in the time-frequency resource of each TP, the method may further include:

determining a mobile service transmitted by the TP; determining, in the time-frequency resource of each TP, a mobile service sub-band for the mobile service, so that mobile service sub-bands of all the TPs are the same; generating mobile service sub-band configuration information based on a time-frequency resource occupied by the mobile service sub-band; and sending the mobile service sub-band configuration information to each TP, so that each TP performs sub-band configuration on the mobile service of the TP based on the mobile service sub-band configuration information. In this way, it is ensured that the tracking resources of all the TPs in the LE are the same, and it can be further ensured that the mobile service sub-bands all the TPs in the LE are the same. In this way, when the terminal moves between different TPs in the LE, the terminal can be rapidly handed over from one TP to another TP with no need to reconfigure a service transmission resource for the LE by the resource configuration apparatus.

In one embodiment of a possible design, when the tracking resource is a tracking sub-band, the determining, in the time-frequency resource of each TP, a mobile service sub-band for the mobile service includes: determining, in the time-frequency resource of each TP except for the tracking sub-band, the mobile service sub-band for the mobile service.

In another possible embodiment of the design, when the terminal is to be handed over from one LE to another LE, the resource configuration apparatus may configure a tracking resource for a TP in a critical area in the following manner. Specifically, when the terminal is located in a preset critical area, the resource configuration apparatus receives coordinated tracking resource configuration information sent by a control device, where the coordinated tracking resource configuration information includes a time-frequency resource occupied by a coordinated tracking resource; obtains a first TP set corresponding to the preset critical area; and sends the coordinated tracking resource configuration information to each TP in the first TP set, so that the TP in the TP set detects, on the coordinated tracking resource, a sounding reference signal SRS sent by the terminal. In the foregoing method, it is ensured that TPs that are in adjacent LEs and that are near the preset critical area have a same tracking resource. When the terminal sends the SRS in the preset critical area, all the TPs that are in the two LEs and that are near the preset critical area can detect the SRS on the tracking resource, so that all the TPs in the two LEs can provide services for the terminal.

In another possible embodiment of a design, after receiving the coordinated tracking resource configuration information sent by the control device, the resource configuration apparatus further receives coordinated service resource configuration information sent by the control device, where the coordinated service resource configuration information includes a time-frequency resource occupied by a coordinated service resource; and sends the coordinated service resource configuration information to each TP in the first TP set, so that the TP in the TP set transmits service data of the terminal by using the coordinated service resource. In the foregoing method, it is ensured that coordinated service resources of the TPs that are in the adjacent LEs and that are near the preset critical area are the same. Therefore, in a process in which the terminal is handed over from one LE to another LE, when the terminal sends data, the TPs in the two LEs can transmit the data sent by the terminal, with no need to reconfigure, by the two LEs, a time-frequency resource used by the terminal to send the data, so that the TPs in the two LEs can simultaneously provide services for the terminal.

In another possible embodiment of a design, after the sending the tracking resource configuration information to each TP, the method further includes: determining, in the tracking resource, a tracking channel for the terminal in the TP; generating tracking channel configuration information based on a time-frequency resource occupied by the tracking channel; obtaining a current location of the terminal, and determining a second TP set based on the current location of the terminal, where a distance between a location of each TP in the second TP set and the current location of the terminal is less than a preset distance; and sending the tracking channel configuration information to the terminal and each TP in the second TP set, where the tracking channel configuration information includes the time-frequency resource occupied by the tracking channel and an identifier of the terminal.

Optionally, the tracking channel configuration information may further include a cycle of sending the SRS.

According to a second aspect, this application provides an embodiment of a resource configuration apparatus, applied to an NCS that includes a plurality of TPs. A time-frequency resource of each TP can be dynamically divided, and the apparatus includes:

a determining module, configured to determine a tracking resource in the time-frequency resource of each TP, where time-frequency resources of all the TPs are the same, and tracking resources determined for all the TPs are the same;

a generation module, configured to generate tracking resource configuration information based on a time-frequency resource occupied by the tracking resource; and a sending module, configured to send the tracking resource configuration information to each TP, so that each TP detects, on the tracking resource, a sounding reference signal SRS sent by a terminal.

In an embodiment of a possible design, the determining module is specifically configured to: perform a same sub-band division on the time-frequency resource of each TP, to obtain a plurality of sub-bands of each TP; and determine a tracking resource in the plurality of sub-bands of each TP, so that the tracking resources of all the TPs are the same. In this design, it is ensured that the tracking resources of all the TPs in the LE are the same, and it can be further ensured that sub-band configurations of all the TPs in the LE are the same. In this way, when the terminal moves between different TPs in the LE, the terminal can be rapidly handed over from one TP to another TP with no need to reconfigure a service transmission resource for the LE by the resource configuration apparatus.

In another embodiment of the possible design, the determining module is specifically configured to: determine a tracking sub-band in the time-frequency resource of each TP, so that tracking sub-bands of all the TPs are the same, and determine, as the tracking resource, a time-frequency resource occupied by the tracking sub-band; or determine a tracking timeslot in the time-frequency resource of each TP, so that tracking timeslots of all the TPs are the same, and determine, as the tracking resource, a time-frequency resource occupied by the tracking timeslot. In this design, it is ensured that the tracking resources of all the TPs in the LE are the same.

In this embodiment of the possible design, further, the determining module is further configured to: after determining the tracking resource in the time-frequency resource of each TP, determine a mobile service transmitted by the TP.

The determining module is further configured to determine, in the time-frequency resource of each TP, a mobile service sub-band for the mobile service, so that mobile service sub-bands of all the TPs are the same.

The generation module is further configured to generate mobile service sub-band configuration information based on a time-frequency resource occupied by the mobile service sub-band.

The sending module is further configured to send the mobile service sub-band configuration information to each TP, so that each TP performs sub-band configuration on the mobile service of the TP based on the mobile service sub-band configuration information.

In this embodiment of the possible design, when the tracking resource is a tracking sub-band, the determining module is specifically configured to determine, in the time-frequency resource of each TP except for the tracking sub-band, the mobile service sub-band for the mobile service.

In another embodiment of the possible design, the apparatus further includes a receiving module and an obtaining module.

The receiving module is configured to: when the terminal is located in a preset critical area, receive coordinated tracking resource configuration information sent by a control device, where the coordinated tracking resource configuration information includes a time-frequency resource occupied by a coordinated tracking resource.

The obtaining module is configured to obtain a first TP set corresponding to the preset critical area.

The sending module is further configured to send the coordinated tracking resource configuration information to each TP in the first TP set, so that the TP in the TP set detects, on the coordinated tracking resource, the sounding reference signal SRS sent by the terminal.

In another embodiment of the possible design, the receiving module is further configured to: after receiving the coordinated tracking resource configuration information sent by the control device, receive coordinated service resource configuration information sent by the control device, where the coordinated service resource configuration information includes a time-frequency resource occupied by a coordinated service resource.

The sending module is further configured to send the coordinated service resource configuration information to each TP in the first TP set, so that the TP in the TP set transmits service data of the terminal by using the coordinated service resource.

In another embodiment of the possible design, the determining module is further configured to: after the sending module sends the tracking resource configuration information to each TP, determine, in the tracking resource, a tracking channel for the terminal in the TP.

The generation module is further configured to: generate tracking channel configuration information based on a time-frequency resource occupied by the tracking channel.

The determining module is further configured to: obtain a current location of the terminal, and determine a second TP set based on the current location of the terminal, where a distance between a location of each TP in the second TP set and the current location of the terminal is less than a preset distance.

The sending module is further configured to send the tracking channel configuration information to the terminal and each TP in the second TP set, where the tracking channel configuration information includes the time-frequency resource occupied by the tracking channel and an identifier of the terminal.

Optionally, the tracking channel configuration information further includes a cycle of sending the SRS.

The apparatus shown in the second aspect may perform the technical solution in any design of the first aspect. Implementation principles and beneficial effects of the embodiments of the apparatus are similar to those of the technical solution, and details are not described herein again.

According to a third aspect, this application provides an embodiment of a resource configuration apparatus, including: a processor, a memory, a communications interface, and a communications bus. The processor, the memory, and the communications interface are connected by using the communications bus.

The memory is configured to store an instruction.

The processor is configured to execute the instruction, and when the processor executes the instruction stored in the memory, the processor performs the resource configuration method in any one of the foregoing possible designs in the first aspect.

In the resource configuration method and apparatus provided in this application, the resource configuration apparatus determines the same tracking resource in the time-frequency resource of each TP, generates the tracking resource configuration information based on the time-frequency resource occupied by the tracking resource, and sends the tracking resource configuration information to each TP, so that the tracking resources of all the TPs are the same, and further it is ensured that when the terminal sends the SRS on the tracking channel on the tracking resource, all the TPs near the terminal can detect the SRS on the tracking resource, and send, to the LE, the measurement information obtained based on the SRS. Therefore, the LE can accurately determine, from all the TPs near the terminal, the TP that provides a service for the terminal, thereby improving NCS service performance.

DESCRIPTION OF EMBODIMENTS

Figure 1:
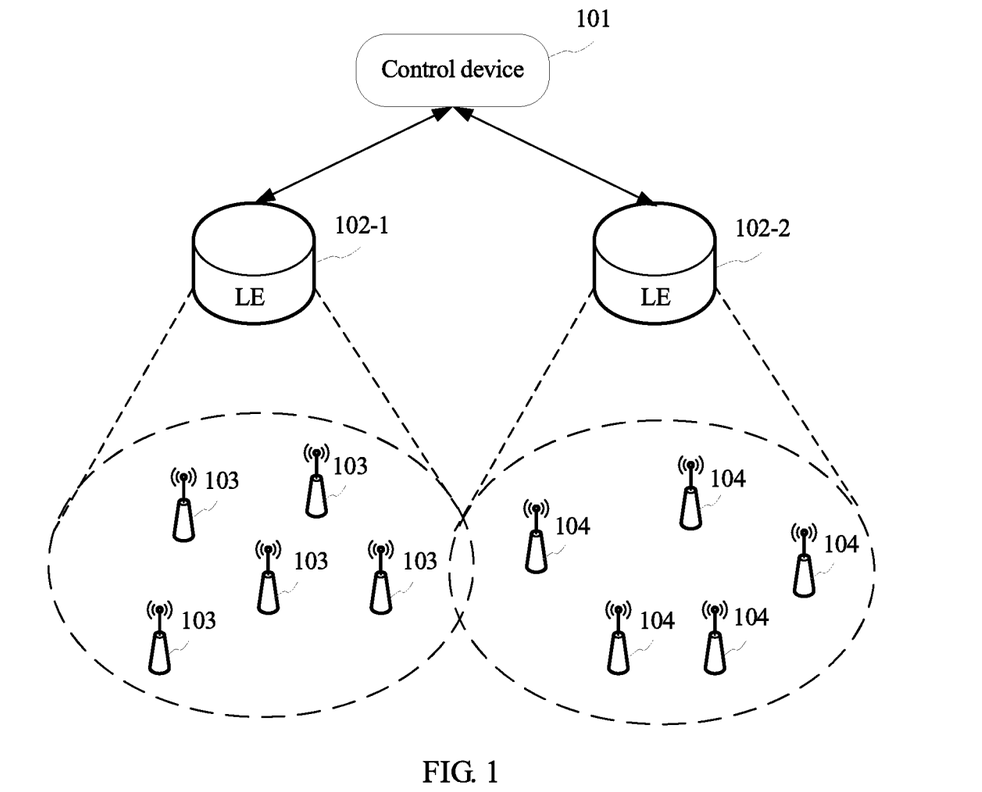
FIG. 1 is a schematic diagram of a network architecture of an NCS according to this application.

FIG. 1 is a schematic diagram of a network architecture of an NCS according to this application. Referring to FIG. 1, the NCS includes a control device 101, LEs (102-1 and 102-2), and a plurality of TPs (103 and 104). The control device 101 manages and controls the LE 102-1 and the LE 102-2, the LE 102-1 manages and controls a plurality of TPs 103 in a management area of the LE 102-1, and the LE 102-2 manages and controls a plurality of TPs 104 in a management area of the LE 102-2. In the NCS network, time-frequency resources used by TPs in each LE are the same, and the time-frequency resource of each TP can be dynamically divided.

Figure 2:
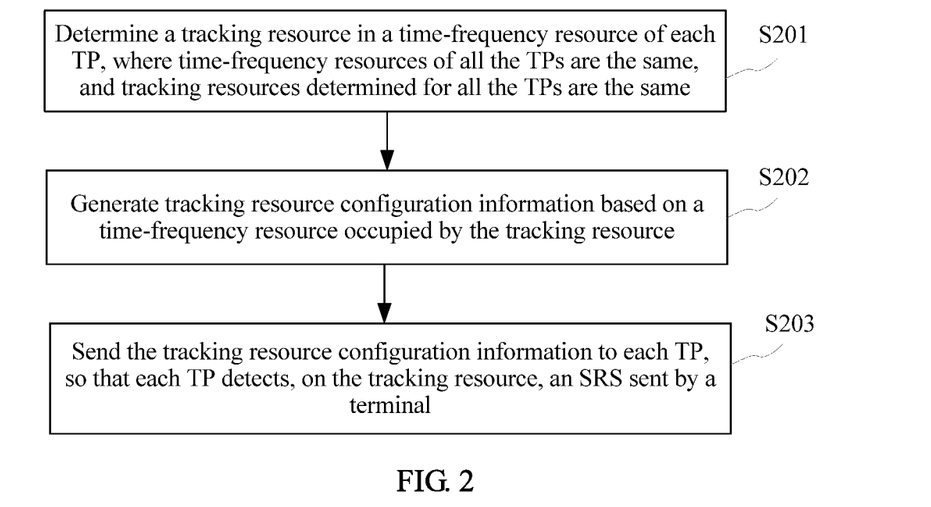
FIG. 2 is a first schematic flowchart of a resource configuration method according to this application.

FIG. 2 is a first schematic flowchart of a resource configuration method according to this application. The method is performed by a resource configuration apparatus disposed in an LE. Referring to FIG. 2, the method may include the following steps.

S201. Determine a tracking resource in a time-frequency resource of each TP, where time-frequency resources of all the TPs are the same, and tracking resources determined for all the TPs are the same.

S202. Generate tracking resource configuration information based on a time-frequency resource occupied by the tracking resource.

S203. Send the tracking resource configuration information to each TP, so that each TP detects, on the tracking resource, an SRS sent by a terminal.

In this application, all TPs in one LE use a same time-frequency resource, and the time-frequency resource of each TP can be dynamically divided. For example, if it is assumed that all TPs in one LE use a same spectrum resource of 100 MHz, and services transmitted by each TP in the LE include a voice and video service, an Internet of Vehicles service, and an Internet of Things service, each TP in the LE can divide the spectrum resource into three sub-bands, to separately transmit the three types of services. A division of the spectrum resource of 100 MHz by each TP in the LE may be shown in Table 1.

TABLE 1

| TP Identifier | Sub-band Identifier | Sub-band Bandwidth |
|---|---|---|
| TP1 | Voice and video service sub-band | 30 MHz |
| | Internet of Vehicles service sub-band | 30 MHz |
| | Internet of Things service sub-band | 40 MHz |
| TP2 | Voice and video service sub-band | 20 MHz |
| | Internet of Vehicles service sub-band | 40 MHz |
| | Internet of Things service sub-band | 40 MHz |
| ... | ... | ... |

In this application, it should be ensured that tracking resources of all TPs in one LE are the same, to enable the TPs to identify an SRS of a nearby terminal. Specifically, the resource configuration apparatus may configure the tracking resources of all the TPs in the LE. A process in which the resource configuration apparatus configures the tracking resources of all the TPs in the LE is described below.

When the resource configuration apparatus configures tracking resources for all TPs in an LE (for example, during network deployment or spectrum resource reconfiguration), because time-frequency resources used by all TPs in one LE are the same, the resource configuration apparatus may first obtain the time-frequency resources used by the TPs in the LE, and determine a same tracking resource in the time-frequency resources. The resource configuration apparatus generates tracking resource configuration information based on a time-frequency resource occupied by the tracking resource, so that the tracking resource configuration information includes information about the time-frequency resource occupied by the tracking resource. Then, the resource configuration apparatus sends the tracking resource configuration information to each TP in the LE. Optionally, the resource configuration apparatus may broadcast the tracking resource configuration information to each TP in the LE, or may separately send the tracking resource configuration information to each TP in the LE. In the foregoing process, because the same tracking resource configuration information is sent to each TP in the LE, the tracking resources of all the TPs in the LE are the same.

After the resource configuration apparatus completes configuration of the tracking resources for the TPs in the LE, the resource configuration apparatus may further configure a tracking channel for UE in the LE. Specifically, the resource configuration apparatus determines, in the tracking resource, a tracking channel for the terminal in the TP, and generates tracking channel configuration information based on a time-frequency resource occupied by the tracking channel. The resource configuration apparatus obtains a current location of the terminal, and determines a second TP set based on the current location of the terminal. A distance between each TP in the second TP set and the current location of the location is less than a preset distance. Then, the resource configuration apparatus sends the tracking channel configuration information to the terminal and each TP in the second TP set, and the tracking channel configuration information includes the time-frequency resource occupied by the tracking channel and an identifier of the terminal. In the process, the resource configuration apparatus sends the tracking channel configuration information to the terminal and the TPs (the TPs in the second TP set) near the terminal, so that after detecting an SRS on the tracking resource, the TP may determine, based on the tracking channel configuration information, the identifier of the terminal that sends the SRS. Further, the tracking channel configuration information further includes a cycle of sending the SRS, so that the terminal can send the SRS based on the sending cycle.

In the foregoing process, the LE determines, in the tracking resource, a tracking channel for a terminal in a management area of the LE, so that the terminal sends an SRS on the tracking channel. Because the tracking resources of all the TPs in the LE are the same, when the terminal sends the SRS on the tracking channel, the SRS sent by the terminal can be detected on tracking resources of all TPs near the terminal. After a plurality of TPs near the terminal detect the SRS, the plurality of TPs separately parse the SRS, to obtain measurement information of the terminal (for example, a network location of the terminal and signal quality of the terminal), and send the measurement information to the LE. The LE determines, from the plurality of TPs based on the measurement information sent by the plurality of TPs, a TP that serves the terminal.

In an example, it is assumed that an LE 1 includes 10 TPs that are denoted as a TP 1 to a TP 10, and it is assumed that each of the TP 1 to the TP 10 uses a spectrum resource of 500 MHz to 600 MHz.

During network deployment, a resource configuration apparatus in the LE 1 may set a spectrum resource of 500 MHz to 505 MHz as a tracking resource, and generate tracking resource configuration information based on the tracking resource. Then, the resource configuration apparatus broadcasts the tracking resource configuration information to the TP 1 to the TP 10, so that each TP determines the spectrum resource of 500 MHz to 505 MHz as the tracking resource, and detects, on the spectrum resource of the 500 MHz to 505 MHz, an SRS sent by a terminal.

In an actual application process, the LE 1 determines a tracking channel for a terminal 1 on the tracking resource (500 MHz to 505 MHz), so that the terminal 1 sends an SRS on the tracking channel. When the terminal 1 sends the SRS on the tracking channel, because the tracking channel is on the tracking resource, and tracking resources of the TP 1 to the TP 10 are the same, TPs near the terminal 1 may detect, on the tracking resource, the SRS sent by the terminal 1.

It is assumed that the TPs near the terminal 1 are the TP 1 to a TP 4. After detecting the SRS sent by the terminal 1, the TP 1 to the TP 4 separately parse the SRS, to obtain measurement information of the terminal 1, and send the measurement information of the terminal 1 to the LE 1. After the LE 1 receives the measurement information sent by the TP1 to the TP4, the LE 1 determines, from the TP 1 to the TP 4, a TP that provides a service for the terminal 1.

In the resource configuration method provided in this application, the resource configuration apparatus determines the same tracking resource in the time-frequency resource of each TP, generates the tracking resource configuration information based on the time-frequency resource occupied by the tracking resource, and sends the tracking resource configuration information to each TP, so that the tracking resources of all the TPs are the same, and further it is ensured that when the terminal sends the SRS on the tracking channel on the tracking resource, all the TPs near the terminal can detect the SRS on the tracking resource, and send, to the LE, the measurement information obtained based on the SRS. Therefore, the LE can accurately determine, from all the TPs near the terminal, the TP that provides a service for the terminal, thereby improving NCS service performance.

Based on the embodiment shown in FIG. 2, the tracking resource may be determined in the time-frequency resource of each TP by using the following three feasible implementations. For details, refer to the following three example embodiments.

First Embodiment

A same sub-band division is performed on the time-frequency resource of each TP, to obtain a plurality of sub-bands of each TP, and a tracking resource is determined in the plurality of sub-bands of each TP, so that the tracking resources of all the TPs are the same.

In this example embodiment, the resource configuration apparatus first performs the same sub-band division on the time-frequency resource of each TP in the LE, to obtain the plurality of sub-bands of each TP; and for each TP in the LE, determines the tracking resource in the plurality of sub-bands of the TP, to obtain the tracking resource of the TP. This process is repeated, so that the tracking resources of all the TPs are the same. In this feasible implementation, not only that tracking resources of all TPs in one LE are the same can be ensured, but also that sub-band divisions of all the TPs are the same can be ensured.

This example embodiment is described below in detail with reference to a schematic diagram of a resource division shown in FIG. 3.

Figure 3:
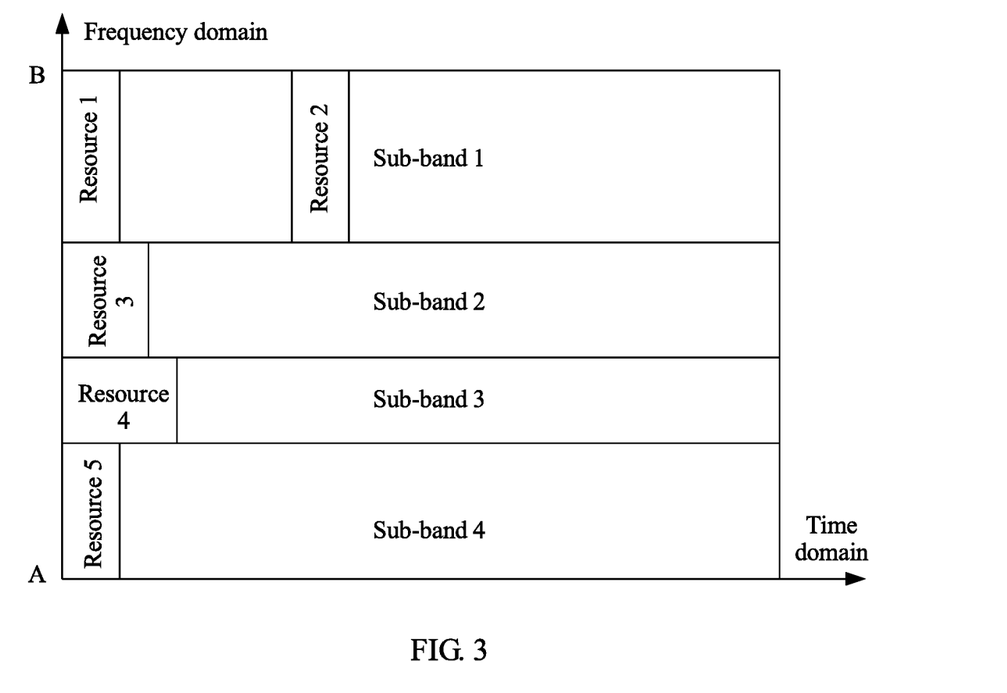
FIG. 3 is a first schematic diagram of a resource division according to this application.

FIG. 3 is a first schematic diagram of a resource division according to this application. Referring to FIG. 3, a horizontal axis represents time domain, a vertical axis represents frequency domain, and a spectrum used by each TP is a frequency A to a frequency B. In an actual application process, when the resource configuration apparatus is to determine a tracking resource for each TP, the resource configuration apparatus divides a time-frequency resource (the frequency A to the frequency B) of the TP into a sub-band 1 to a sub-band 4 shown in FIG. 3. A sub-band division of each TP in the LE is shown in FIG. 3.

After the resource configuration apparatus performs the same sub-band division on the time-frequency resource of each TP to obtain the sub-band 1 to the sub-band 4, the resource configuration apparatus determines a resource 1 and a resource 2 in the sub-band 1 as the tracking resource, determines a resource 3 in the sub-band 2 as the tracking resource, determines a resource 4 in the sub-band 3 as the tracking resource, and determines a resource 5 in the sub-band 4 as the tracking resource, so that the tracking resource of each TP in the LE is the resource 1 to the resource 5.

Second Embodiment

A tracking sub-band is determined in the time-frequency resource of each TP, so that tracking sub-bands of all the TPs are the same, and a time-frequency resource occupied by the tracking sub-band is determined as the tracking resource.

In this embodiment, the resource configuration apparatus divides, in the time-frequency resource of each TP, a universal sub-band as the tracking sub-band, and determines, as the tracking resource, the time-frequency resource occupied by the tracking sub-band. Tracking sub-bands divided by the resource configuration apparatus for all the TPs are the same.

This embodiment is described below in detail with reference to a schematic diagram of a resource division shown in FIG. 4.

Figure 4:
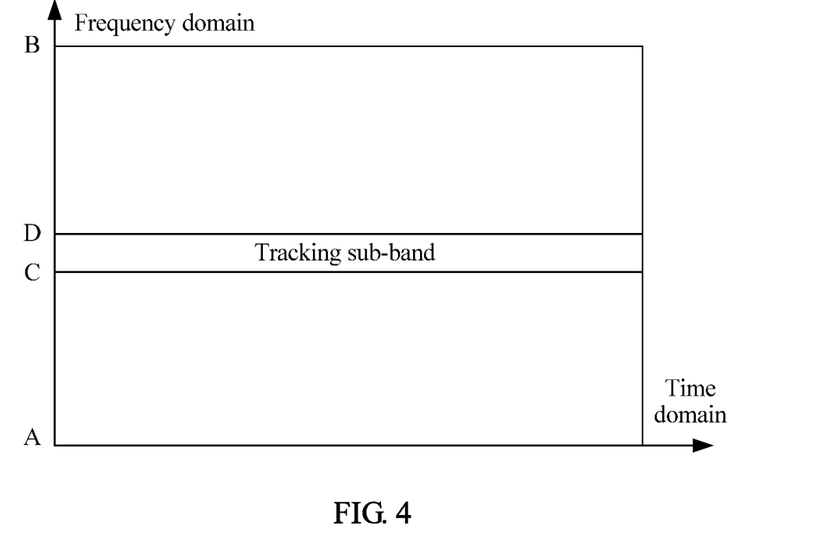
FIG. 4 is a second schematic diagram of a resource division according to this application.

FIG. 4 is a second schematic diagram of a resource division according to this application. Referring to FIG. 4, a horizontal axis represents time domain, a vertical axis represents frequency domain, and a spectrum used by each TP is a frequency A to a frequency B. In an actual application process, when the resource configuration apparatus is to determine a tracking resource for each TP, the resource configuration apparatus determines a frequency C to a frequency D in the frequency A to the frequency B as the tracking sub-band. Tracking sub-bands of all the TPs in the LE are the frequency C to the frequency D. It should be noted that, in this feasible implementation, the tracking sub-bands of all the TPs in the LE are the same, and other sub-band divisions may be the same, or may be different.

Third Embodiment

A tracking timeslot is determined in the time-frequency resource of each TP, so that tracking timeslots of all the TPs are the same, and a time-frequency resource occupied by the tracking timeslot is determined as the tracking resource.

In this embodiment, the resource configuration apparatus divides, in the time-frequency resource of each TP, one or more timeslots as the tracking timeslot, and determines, as the tracking resource, the time-frequency resource occupied by the tracking timeslot. Tracking timeslots divided by the resource configuration apparatus for all the TPs are the same.

This embodiment is described below in detail with reference to a schematic diagram of a resource division shown in FIG. 5.

Figure 5:
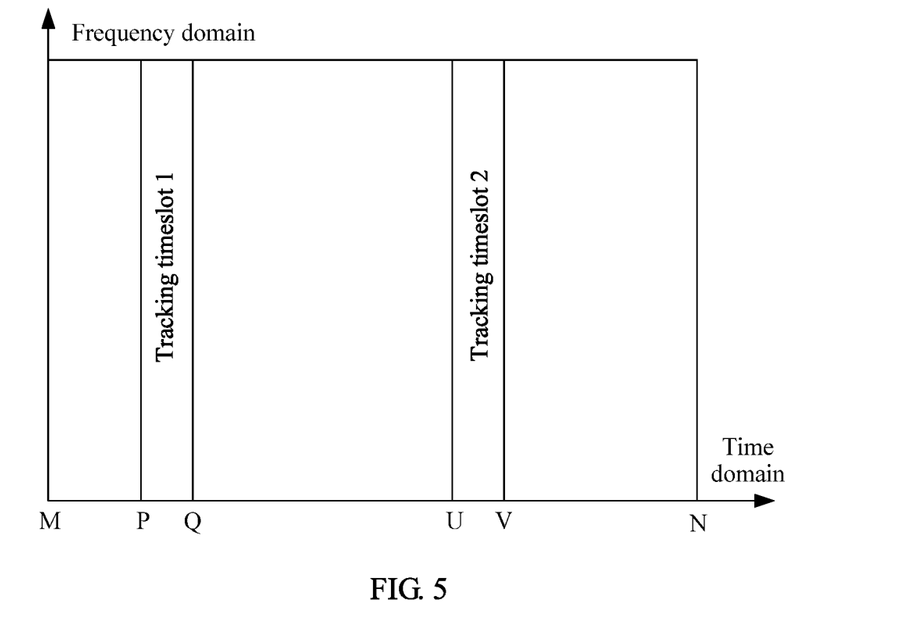
FIG. 5 is a third schematic diagram of a resource division according to this application.

FIG. 5 is a third schematic diagram of a resource division according to this application. Referring to FIG. 5, a horizontal axis represents time domain, a vertical axis represents frequency domain, and a time-domain resource used by each TP is a moment M to a moment N. In an actual application process, when the resource configuration apparatus is to determine a tracking resource for each TP, the resource configuration apparatus determines a timeslot between a moment P to a moment Q in the moment M to the moment N as a tracking timeslot 1, and determines a timeslot between a moment U to a moment V in the moment M to the moment N as a tracking timeslot 2. Tracking timeslots of all the TPs in the LE are the tracking timeslot 1 and the tracking timeslot 2. It should be noted that, in this feasible implementation, the tracking timeslots of all the TPs in the LE are the same, and other timelot divisions of all the TPs may be the same, or may be different.

In the foregoing second and third embodiments, only tracking resources of all TPs in one LE are ensured to be the same, but other sub-band divisions of all the TPs cannot be ensured to be the same. In an actual application process, after the resource configuration apparatus determines a tracking resource for each TP, when the terminal moves between different TPs in one LE, a same sub-band may be configured for a mobile service of each TP, to ensure that the terminal can be rapidly handed over from one TP to another TP. For details, refer to an embodiment shown in FIG. 6.

Figure 6:
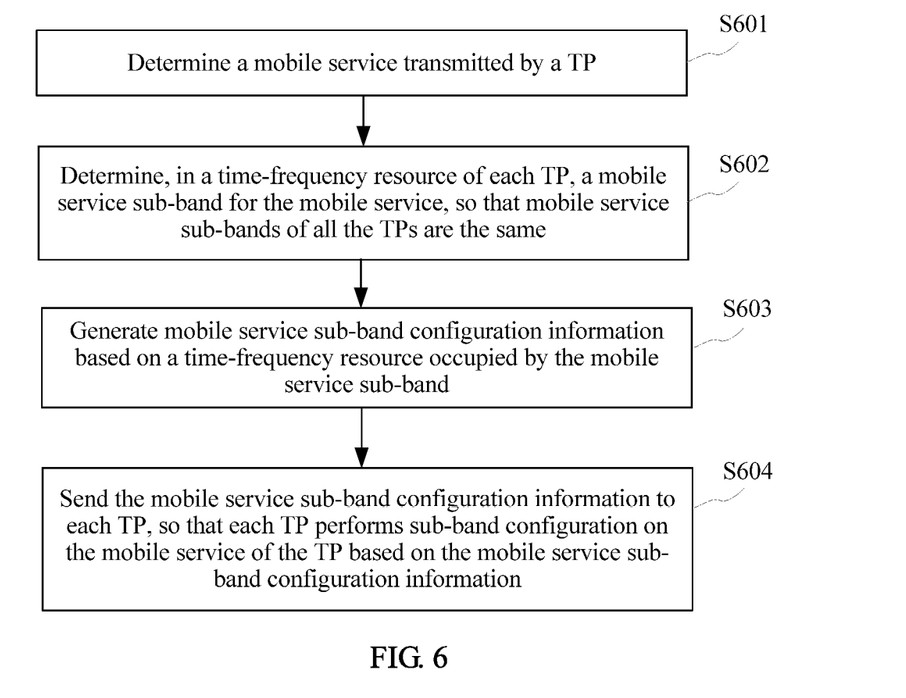
FIG. 6 is a schematic flowchart of a method for performing sub-band configuration for a mobile service according to this application.

FIG. 6 is a schematic flowchart of a method for performing sub-band configuration for a mobile service according to this application. Referring to FIG. 6, the method may include the following steps.

S601. Determine a mobile service transmitted by a TP.

S602. Determine, in a time-frequency resource of each TP, a mobile service sub-band for the mobile service, so that mobile service sub-bands of all the TPs are the same.

S603. Generate mobile service sub-band configuration information based on a time-frequency resource occupied by the mobile service sub-band.

S604. Send the mobile service sub-band configuration information to each TP, so that each TP performs sub-band configuration on the mobile service of the TP based on the mobile service sub-band configuration information.

In the embodiment shown in FIG. 6, if a terminal can move, a service provided for the terminal is referred to as a mobile service. For example, the terminal that can move may be a mobile phone or a car. Correspondingly, the mobile service may be a conventional phone-video service, an Internet of Vehicles service, or the like.

In an embodiment of an actual application process, when a resource configuration apparatus is to perform sub-band configuration for a mobile service of a TP, the resource configuration apparatus first obtains the mobile service transmitted by the TP. Optionally, the mobile service may be preset. After the resource configuration apparatus determines that the mobile service transmitted by the TP is obtained, the resource configuration apparatus determines, in a time-frequency resource of each TP, a mobile service sub-band for the mobile service. Specifically, when a tracking resource configured for the TP is a tracking sub-band, the mobile service sub-band for the mobile service is determined in the time-frequency resource of each TP except for the tracking sub-band.

After the resource configuration apparatus determines the mobile service sub-band for the mobile service of each TP, the resource configuration apparatus generates the mobile service sub-band configuration information, and sends the mobile service sub-band configuration information to each TP, so that each TP performs sub-band configuration on the mobile service of the TP based on the mobile service sub-band configuration information, so that the mobile service sub-bands of all the TPs in an LE are the same.

In the solution shown in the embodiment in FIG. 6, it can be ensured that tracking resources and the mobile service sub-bands of all the TPs in the LE are the same, and fixed service sub-bands may be the same, or may be different. If the terminal cannot move, a service provided for the terminal is referred to as a fixed service. For example, the terminal that cannot move may be a fixed Internet of Things device. Correspondingly, the fixed service may be an Internet of Things service. Because a terminal corresponding to a fixed service does not move between different TPs, different fixed service sub-bands of all the TPs do not cause any influence to the fixed service.

On the basis of any one of the foregoing embodiments, in a process in which the terminal moves from one LE to another LE, it should be ensured that when the terminal is located in an intersection area of two LEs, the terminal can simultaneously obtain services from the two LEs, to ensure that a service of the terminal is not interrupted. Therefore, it should be ensured that tracking sub-bands of TPs in the intersection area of the two LEs are the same. A resource configuration method used in this case is described below in detail by using an embodiment shown in FIG. 7.

Figure 7:
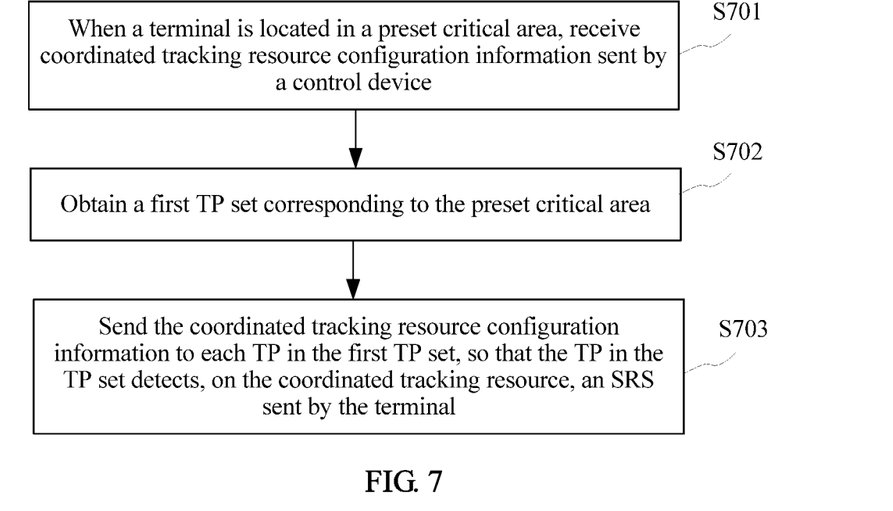
FIG. 7 is a second schematic flowchart of a resource configuration method according to this application.

FIG. 7 is a second schematic flowchart of a resource configuration method according to this application. Referring to FIG. 7, the method may include the following steps.

S701. When a terminal is located in a preset critical area, receive coordinated tracking resource configuration information sent by a control device, where the coordinated tracking resource configuration information includes a time-frequency resource occupied by a coordinated tracking resource.

S702. Obtain a first TP set corresponding to the preset critical area.

S703. Send the coordinated tracking resource configuration information to each TP in the first TP set, so that the TP in the TP set detects, on the coordinated tracking resource, an SRS sent by the terminal.

In an embodiment of an actual application process, the TP detects, in real time, the SRS sent by the terminal, obtains measurement information of the terminal based on the SRS, and sends the measurement information to a resource configuration apparatus. The resource configuration apparatus further sends the measurement information to the control device, and the control device determines, based on the measurement information, whether the terminal is currently located in the preset critical area. When the control device determines that the terminal is currently located in the preset critical area, the control device obtains at least two LEs corresponding to the preset critical area, where the at least two LEs are adjacent LEs, determines a coordinated tracking resource in time-frequency resources of TPs in the LEs, generates coordinated tracking resource configuration information based on the coordinated tracking resource, and sends the coordinated tracking resource configuration information to resource configuration apparatuses in the at least two LEs. A plurality of TPs in an intersection area of the at least two LEs use a same time-frequency resource.

After the resource configuration apparatuses in the at least two LEs receive the coordinated tracking resource configuration information sent by the control device, the resource configuration apparatuses separately obtain the first TP set corresponding to the preset critical area, and send the coordinated tracking resource configuration information to each TP in the first TP set, so that the TP in the TP set detects, on the coordinated tracking resource, the SRS sent by the terminal. The TP in the first TP set is a TP near the preset critical area.

In the method shown in the embodiment in FIG. 7, it can be ensured that TPs that are in the adjacent LEs and that are near the preset critical area have a same tracking resource. In this way, when the terminal sends the SRS in the preset critical area, all the TPs that are in the two LEs and that are near the preset critical area can detect the SRS on the tracking resource, so that all the TPs in the two LEs can provide services for the terminal.

In an embodiment of an actual application process, same coordinated service resource configuration information may be further configured for the TPs that are in the adjacent LEs and that are near the preset critical area, to ensure that the TPs in the two LEs can easily provide services for the terminal. Specifically, after sending the coordinated tracking resource configuration information to the resource configuration apparatuses, the control device may further send the coordinated service resource configuration information to the resource configuration apparatuses, and the coordinated service resource configuration information includes a time-frequency resource occupied by a coordinated service resource. After the resource configuration apparatuses receive the coordinated service resource configuration information, the resource configuration apparatuses send the coordinated service resource configuration information to each TP in the first TP set. Then, each TP in the first TP set sends the coordinated service resource configuration information to a terminal in an area covered by the TP, so that the terminal sends data on a corresponding time-frequency resource based on the coordinated service resource configuration information. In the foregoing method, coordinated service resources of the TPs that are in the adjacent LEs and that are near the preset critical area are the same. Therefore, in a process in which the terminal is handed over from one LE to another LE, when the terminal sends data, the TPs in the two LEs can transmit the data sent by the terminal, with no need to reconfigure, by the two LEs, a time-frequency resource used by the terminal to send the data, so that the TPs in the two LEs can simultaneously provide services for the terminal.

Figure 8:
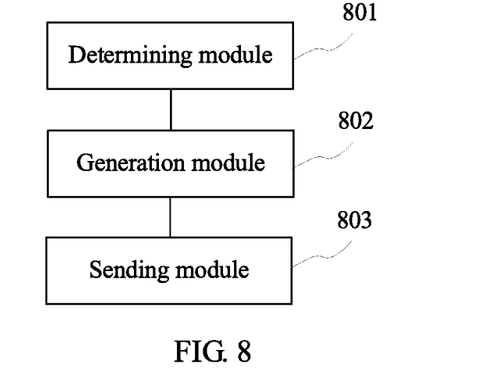
FIG. 8 is a first schematic structural diagram of a resource configuration apparatus according to this application.

FIG. 8 is a first schematic structural diagram of a resource configuration apparatus according to this application. The resource configuration apparatus may be disposed in an LE. Referring to FIG. 8, the apparatus may include:

a determining module 801, configured to determine a tracking resource in a time-frequency resource of each TP, where time-frequency resources of all the TPs are the same, and tracking resources determined for all the TPs are the same;

a generation module 802, configured to generate tracking resource configuration information based on a time-frequency resource occupied by the tracking resource; and a sending module 803, configured to send the tracking resource configuration information to each TP, so that each TP detects, on the tracking resource, an SRS sent by a terminal.

Optionally, the determining module 801 may be specifically configured to:

perform a same sub-band division on the time-frequency resource of each TP, to obtain a plurality of sub-bands of each TP; and determine a tracking resource in the plurality of sub-bands of each TP, so that the tracking resources of all the TPs are the same.

Further, the determining module 801 may be further specifically configured to: determine a tracking sub-band in the time-frequency resource of each TP, so that tracking sub-bands of all the TPs are the same, and determine, as the tracking resource, a time-frequency resource occupied by the tracking sub-band; or determine a tracking timeslot in the time-frequency resource of each TP, so that tracking timeslots of all the TPs are the same, and determine, as the tracking resource, a time-frequency resource occupied by the tracking timeslot. The determining module 801 may be further configured to: after determining the tracking resource in the time-frequency resource of each TP, determine a mobile service transmitted by the TP.

The determining module 801 may be further configured to determine, in the time-frequency resource of each TP, a mobile service sub-band for the mobile service, so that mobile service sub-bands of all the TPs are the same.

The generation module 802 may be further configured to generate mobile service sub-band configuration information based on a time-frequency resource occupied by the mobile service sub-band.

The sending module 803 may be further configured to send the mobile service sub-band configuration information to each TP, so that each TP performs sub-band configuration on the mobile service of the TP based on the mobile service sub-band configuration information.

In an embodiment of an actual application process, when the tracking resource is a tracking sub-band, the determining module 801 may be specifically configured to determine, in the time-frequency resource of each TP except for the tracking sub-band, the mobile service sub-band for the mobile service.

Figure 9:
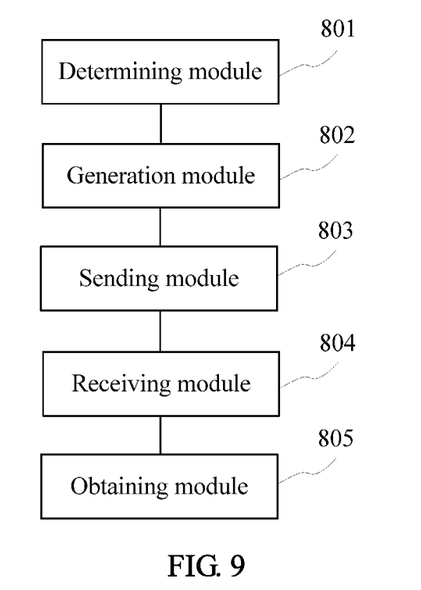
FIG. 9 is a second schematic structural diagram of a resource configuration apparatus according to this application.

FIG. 9 is a second schematic structural diagram of a resource configuration apparatus according to this application. Based on the embodiment shown in FIG. 8, referring to FIG. 9, the apparatus may further include a receiving module 804 and an obtaining module 805.

The receiving module 804 is configured to: when the terminal is located in a preset critical area, receive coordinated tracking resource configuration information sent by a control device, where the coordinated tracking resource configuration information includes a time-frequency resource occupied by a coordinated tracking resource.

The obtaining module 805 is configured to obtain a first TP set corresponding to the preset critical area.

The sending module 803 may be further configured to send the coordinated tracking resource configuration information to each TP in the first TP set, so that the TP in the TP set detects, on the coordinated tracking resource, the SRS sent by the terminal.

In an embodiment of an actual application process, the receiving module 804 may be further configured to: after receiving the coordinated tracking resource configuration information sent by the control device, receive coordinated service resource configuration information sent by the control device, where the coordinated service resource configuration information includes a time-frequency resource occupied by a coordinated service resource.

The sending module 804 may be further configured to send the coordinated service resource configuration information to each TP in the first TP set, so that the TP in the TP set transmits service data of the terminal by using the coordinated service resource.

In an embodiment of an actual application process, the determining module 801 may be further configured to: after the sending module 803 sends the tracking resource configuration information to each TP, determine, in the tracking resource, a tracking channel for the terminal in the TP.

The generation module 802 may be further configured to: generate tracking channel configuration information based on a time-frequency resource occupied by the tracking channel.

The determining module 801 may be further configured to: obtain a current location of the terminal, and determine a second TP set based on the current location of the terminal, where a distance between a location of each TP in the second TP set and the current location of the terminal is less than a preset distance.

The sending module 803 may be further configured to send the tracking channel configuration information to the terminal and each TP in the second TP set, where the tracking channel configuration information includes the time-frequency resource occupied by the tracking channel and an identifier of the terminal.

Optionally, the tracking channel configuration information further includes a cycle of sending the SRS.

It should be noted that the apparatus shown in this application may perform the technical solutions shown in the foregoing method embodiments. Implementation principles and beneficial effects of the apparatus are similar to those of the technical solutions, and details are not described herein again.

Figure 10:
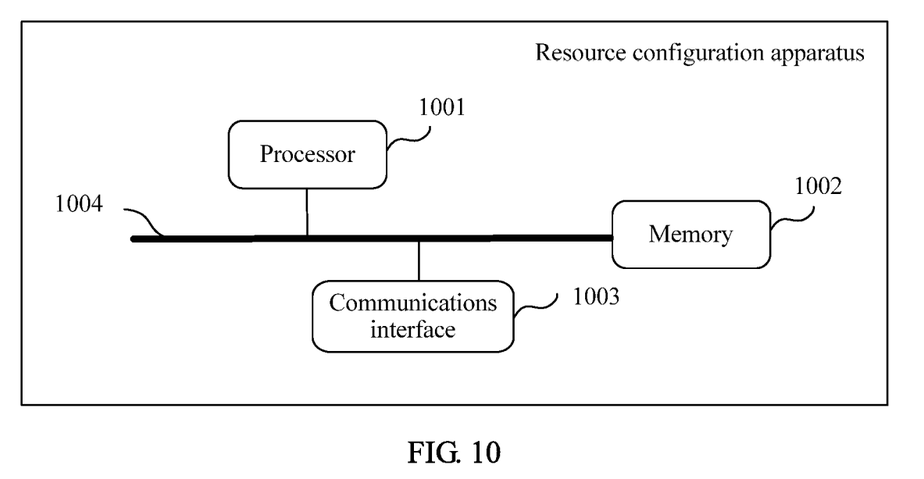
FIG. 10 is a third schematic structural diagram of a resource configuration apparatus according to this application.

FIG. 10 is a third schematic structural diagram of a resource configuration apparatus according to this application. Referring to FIG. 10, the apparatus may include a processor 1001, a memory 1002, a communications interface 1003, and a communications bus 1004. The processor 1001, the memory 1002, and the communications interface 1003 are connected by using the communications bus 1004.

The processor 1001 may be a central processing unit. The processor 1001 may be a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logical device, a discrete gate or transistor logic device, or a discrete hardware component. The general purpose processor may be a microprocessor, or the processor may be any conventional processor or the like. The memory 1002 may include a random access memory (Random Access Memory, RAM), the memory 1002 may also include a nonvolatile memory, such as a read-only memory (Read-Only Memory, ROM), a flash memory, or a solid state disk (Solid State Disk, SSD), and the memory 1002 may further include a combination of the foregoing memories. The communications interface 1003 may be an interface circuit, configured to receive and send information. After receiving information sent by an external device, the communications interface 1003 sends the information to the processor 1001 for processing. In addition, the communications interface 1003 may communicate with a network and another device through wired communication or wireless communication.

The memory 1002 is configured to store an instruction.

The processor 1001 is configured to execute the instruction, and when the processor 1001 executes the instruction stored in the memory 1002, the processor 1001 performs the resource configuration method described in any one of the foregoing method embodiments.

It should be noted that the resource configuration apparatus provided in this application may perform the technical solutions shown in the foregoing method embodiments. Implementation principles and beneficial effects of the apparatus are similar to those of the technical solutions, and details are not described herein again.

What is claimed is:

1. A resource configuration method, applied to a non-cellular system (NCS) that comprises a plurality of transmission points (TPs), wherein a time-frequency resource of each TP can be dynamically divided, and the method comprises:
    determining a tracking resource in the time-frequency resource of each TP, wherein time-frequency resources of all the TPs are the same, and tracking resources determined for all the TPs are the same;
    generating tracking resource configuration information for all of the TPs based on a time-frequency resource occupied by the tracking resource; and
    sending the tracking resource configuration information to each TP, so that each TP detects, on the tracking resource, a sounding reference signal (SRS) sent by a terminal for determining which of the TPs is to provide a service to the terminal based at least in part on the SRS.

2. The method according to claim 1, wherein the determining a tracking resource in the time-frequency resource of each TP comprises:
    performing a same sub-band division on the time-frequency resource of each TP, to obtain a plurality of sub-bands of each TP; and
    determining a tracking resource in the plurality of sub-bands of each TP, so that the tracking resources of all the TPs are the same.

3. The method according to claim 1, wherein the determining a tracking resource in the time-frequency resource of each TP comprises:
    determining a tracking sub-band in the time-frequency resource of each TP, so that tracking sub-bands of all the TPs are the same, and determining, as the tracking resource, a time-frequency resource occupied by the tracking sub-band; or
    determining a tracking timeslot in the time-frequency resource of each TP, so that tracking timeslots of all the TPs are the same, and determining, as the tracking resource, a time-frequency resource occupied by the tracking timeslot.

4. The method according to claim 3, wherein after the determining a tracking resource in the time-frequency resource of each TP, the method further comprises:
    determining a mobile service transmitted by the TP;
    determining, in the time-frequency resource of each TP, a mobile service sub-band for the mobile service, so that mobile service sub-bands of all the TPs are the same;
    generating mobile service sub-band configuration information based on a time-frequency resource occupied by the mobile service sub-band; and
    sending the mobile service sub-band configuration information to each TP, so that each TP performs sub-band configuration on the mobile service of the TP based on the mobile service sub-band configuration information.

5. The method according to claim 1, wherein the method further comprises:
    when the terminal is located in a preset critical area, receiving coordinated tracking resource configuration information sent by a control device, wherein the coordinated tracking resource configuration information comprises a time-frequency resource occupied by a coordinated tracking resource;
    obtaining a first TP set corresponding to the preset critical area; and
    sending the coordinated tracking resource configuration information to each TP in the first TP set, so that the TP in the TP set detects, on the coordinated tracking resource, the SRS sent by the terminal.

6. The method according to claim 5, wherein after the receiving coordinated tracking resource configuration information sent by a control device, the method further comprises:
    receiving coordinated service resource configuration information sent by the control device, wherein the coordinated service resource configuration information comprises a time-frequency resource occupied by a coordinated service resource; and
    sending the coordinated service resource configuration information to each TP in the first TP set, so that the TP in the TP set transmits service data of the terminal by using the coordinated service resource.

7. The method according to claim 1, wherein after the sending the tracking resource configuration information to each TP, the method further comprises:
  determining, in the tracking resource, a tracking channel for the terminal in the TP;
  generating tracking channel configuration information based on a time-frequency resource occupied by the tracking channel;
  obtaining a current location of the terminal, and determining a second TP set based on the current location of the terminal, wherein a distance between a location of each TP in the second TP set and the current location of the terminal is less than a preset distance; and
  sending the tracking channel configuration information to the terminal and each TP in the second TP set, wherein the tracking channel configuration information comprises the time-frequency resource occupied by the tracking channel and an identifier of the terminal.

8. A resource configuration apparatus, applied to a non-cellular system (NCS) that comprises a plurality of transmission points (TPs), wherein a time-frequency resource of each TP can be dynamically divided, and the apparatus comprises:
  a processor, configured to determine a tracking resource in the time-frequency resource of each TP, wherein time-frequency resources of all the TPs are the same, and tracking resources determined for all the TPs are the same;
  the processor, configured to generate tracking resource configuration information for all of the TPs based on a time-frequency resource occupied by the tracking resource; and
  a communications interface, configured to send the tracking resource configuration information to each TP, so that each TP detects, on the tracking resource, a sounding reference signal SRS sent by a terminal for determining which of the TPs is to provide a service to the terminal based at least in part on the SRS.

9. The apparatus according to claim 8, wherein the processor is configured to:
  perform a same sub-band division on the time-frequency resource of each TP, to obtain a plurality of sub-bands of each TP; and
  determine a tracking resource in the plurality of sub-bands of each TP, so that the tracking resources of all the TPs are the same.

10. The apparatus according to claim 8, wherein the processor is configured to: determine a tracking sub-band in the time-frequency resource of each TP, so that tracking sub-bands of all the TPs are the same, and determine, as the tracking resource, a time-frequency resource occupied by the tracking sub-band; or
  determine a tracking timeslot in the time-frequency resource of each TP, so that tracking timeslots of all the TPs are the same, and determine, as the tracking resource, a time-frequency resource occupied by the tracking timeslot.

11. The apparatus according to claim 10, wherein the processor is further configured to: after determining the tracking resource in the time-frequency resource of each TP, determine a mobile service transmitted by the TP;
  the processor is further configured to determine, in the time-frequency resource of each TP, a mobile service sub-band for the mobile service, so that mobile service sub-bands of all the TPs are the same;
  the processor is further configured to generate mobile service sub-band configuration information based on a time-frequency resource occupied by the mobile service sub-band; and
  the communications interface is further configured to send the mobile service sub-band configuration information to each TP, so that each TP performs sub-band configuration on the mobile service of the TP based on the mobile service sub-band configuration information.

12. The apparatus according to claim 8, wherein the communications interface is configured to: when the terminal is located in a preset critical area, receive coordinated tracking resource configuration information sent by a control device, wherein the coordinated tracking resource configuration information comprises a time-frequency resource occupied by a coordinated tracking resource;
  the processor is configured to obtain a first TP set corresponding to the preset critical area; and
  the communications interface is further configured to send the coordinated tracking resource configuration information to each TP in the first TP set, so that the TP in the TP set detects, on the coordinated tracking resource, the SRS sent by the terminal.

13. The apparatus according to claim 12, wherein:
  the communications interface is further configured to: after receiving the coordinated tracking resource configuration information sent by the control device, receive coordinated service resource configuration information sent by the control device, wherein the coordinated service resource configuration information comprises a time-frequency resource occupied by a coordinated service resource; and
  the communications interface is further configured to send the coordinated service resource configuration information to each TP in the first TP set, so that the TP in the TP set transmits service data of the terminal by using the coordinated service resource.

14. The apparatus according to claim 8, further comprising:
  the processor is further configured to: after the communications interface sends the tracking resource configuration information to each TP, determine, in the tracking resource, a tracking channel for the terminal in the TP; and
  the processor is further configured to: generate tracking channel configuration information based on a time-frequency resource occupied by the tracking channel;
  the processor is further configured to: obtain a current location of the terminal, and determine a second TP set based on the current location of the terminal, wherein a distance between a location of each TP in the second TP set and the current location of the terminal is less than a preset distance; and
  the communications interface is further configured to send the tracking channel configuration information to the terminal and each TP in the second TP set, wherein the tracking channel configuration information comprises the time-frequency resource occupied by the tracking channel and an identifier of the terminal.

15. A non-transitory computer readable storage medium having instructions stored thereon, which when executed by at least one processor, causes the at least one processor to perform one or more operations of a resource configuration method in a non-cellular system (NCS) that comprises a plurality of transmission points (TPs), wherein a time-frequency resource of each TP can be dynamically divided, the one or more operations comprising:

determining a tracking resource in the time-frequency resource of each TP, wherein time-frequency resources of all the TPs are the same, and tracking resources determined for all the TPs are the same;

generating tracking resource configuration information for all of the TPs based on a time-frequency resource occupied by the tracking resource; and sending the tracking resource configuration information to each TP, so that each TP detects, on the tracking resource, a sounding reference signal (SRS) sent by a terminal for determining which of the TPs is to provide a service to the terminal based at least in part on the SRS.

16. The non-transitory computer readable storage medium according to claim 15, wherein the determining a tracking resource in the time-frequency resource of each TP comprises:

performing a same sub-band division on the time-frequency resource of each TP, to obtain a plurality of sub-bands of each TP; and determining a tracking resource in the plurality of sub-bands of each TP, so that the tracking resources of all the TPs are the same.

17. The non-transitory computer readable storage medium according to claim 15, wherein the determining a tracking resource in the time-frequency resource of each TP comprises:

determining a tracking sub-band in the time-frequency resource of each TP, so that tracking sub-bands of all the TPs are the same, and determining, as the tracking resource, a time-frequency resource occupied by the tracking sub-band; or determining a tracking timeslot in the time-frequency resource of each TP, so that tracking timeslots of all the TPs are the same, and determining, as the tracking resource, a time-frequency resource occupied by the tracking timeslot.

18. The non-transitory computer readable storage medium according to claim 17, wherein after the determining a tracking resource in the time-frequency resource of each TP, the one or more operations further comprise:

determining a mobile service transmitted by the TP;

determining, in the time-frequency resource of each TP, a mobile service sub-band for the mobile service, so that mobile service sub-bands of all the TPs are the same;

generating mobile service sub-band configuration information based on a time-frequency resource occupied by the mobile service sub-band; and sending the mobile service sub-band configuration information to each TP, so that each TP performs sub-band configuration on the mobile service of the TP based on the mobile service sub-band configuration information.

19. The non-transitory computer readable storage medium according to claim 15, wherein the one or more operations further comprise:

when the terminal is located in a preset critical area, receiving coordinated tracking resource configuration information sent by a control device, wherein the coordinated tracking resource configuration information comprises a time-frequency resource occupied by a coordinated tracking resource;

obtaining a first TP set corresponding to the preset critical area; and sending the coordinated tracking resource configuration information to each TP in the first TP set, so that the TP in the TP set detects, on the coordinated tracking resource, the SRS sent by the terminal.

20. The non-transitory computer readable storage medium according to claim 19, wherein after the receiving coordinated tracking resource configuration information sent by a control device, the one or more operations further comprise:

receiving coordinated service resource configuration information sent by the control device, wherein the coordinated service resource configuration information comprises a time-frequency resource occupied by a coordinated service resource; and sending the coordinated service resource configuration information to each TP in the first TP set, so that the TP in the TP set transmits service data of the terminal by using the coordinated service resource.

* * * * *